R. E. LANGSTON.
APPARATUS FOR PURIFYING AND FILTERING LIQUIDS.
APPLICATION FILED OCT. 13, 1919.
1,407,762. Patented Feb. 28, 1922.
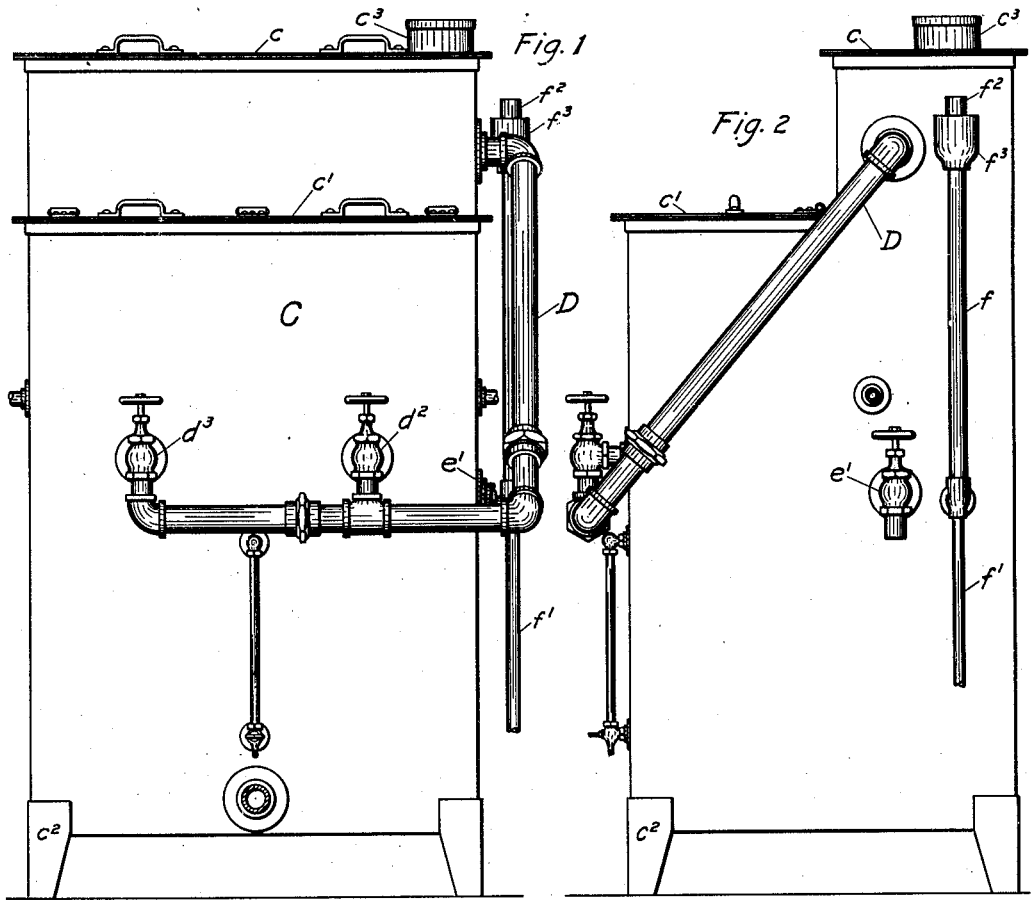
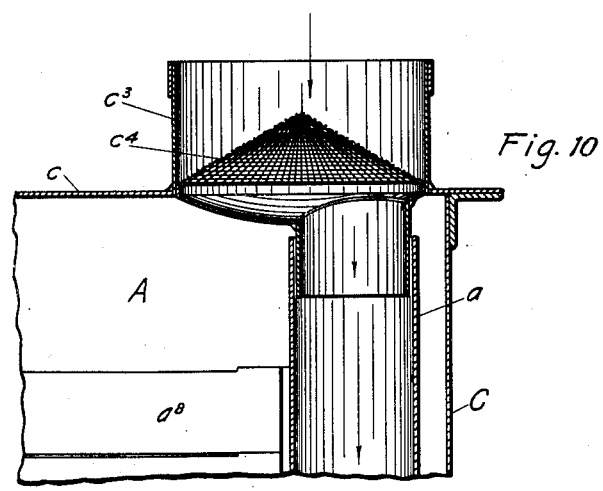

R. E. LANGSTON.
APPARATUS FOR PURIFYING AND FILTERING LIQUIDS.
APPLICATION FILED OCT. 13, 1919.
1,407,762.
Patented Feb. 28, 1922.
3 SHEETS—SHEET 2.
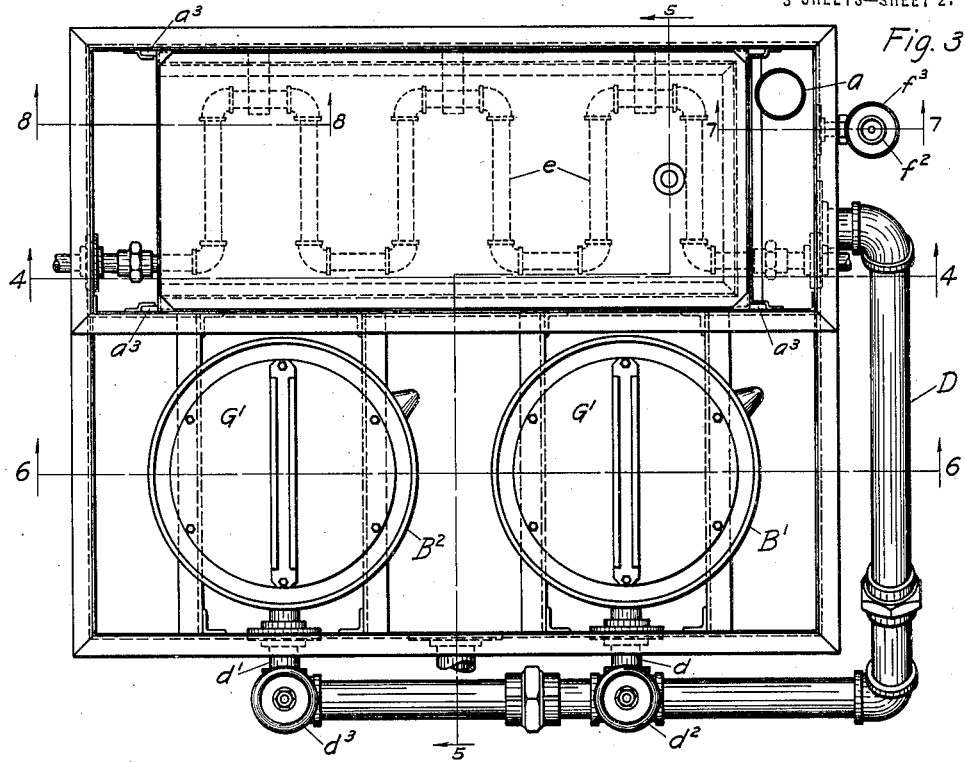
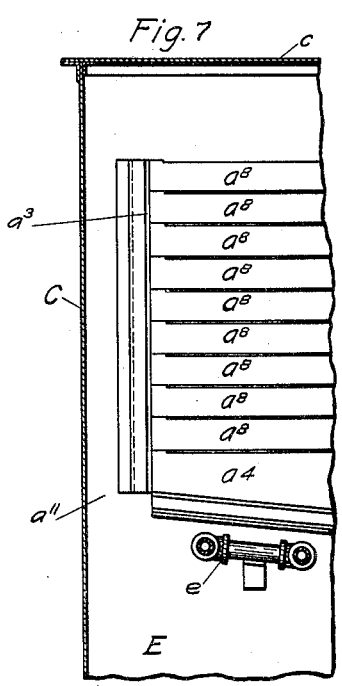
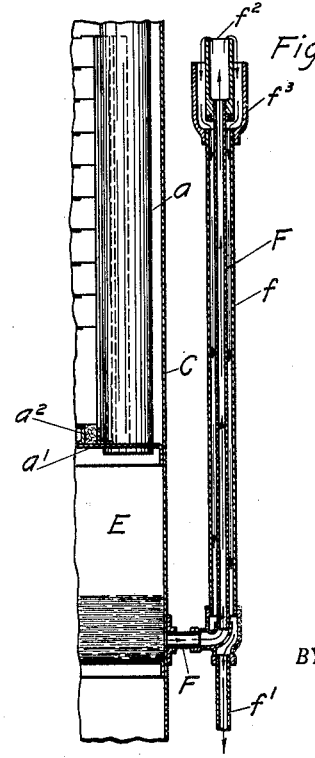
INVENTOR.
Robert E. Langston
BY
Walter A. Knight
ATTORNEY.

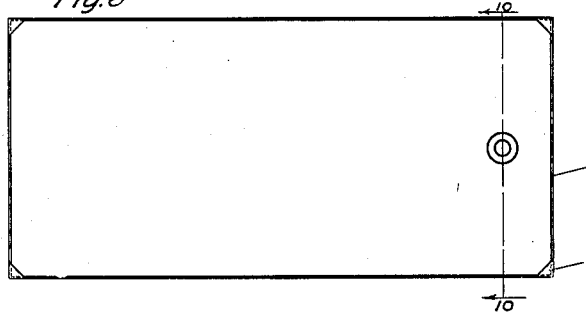
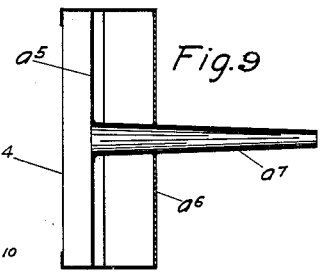
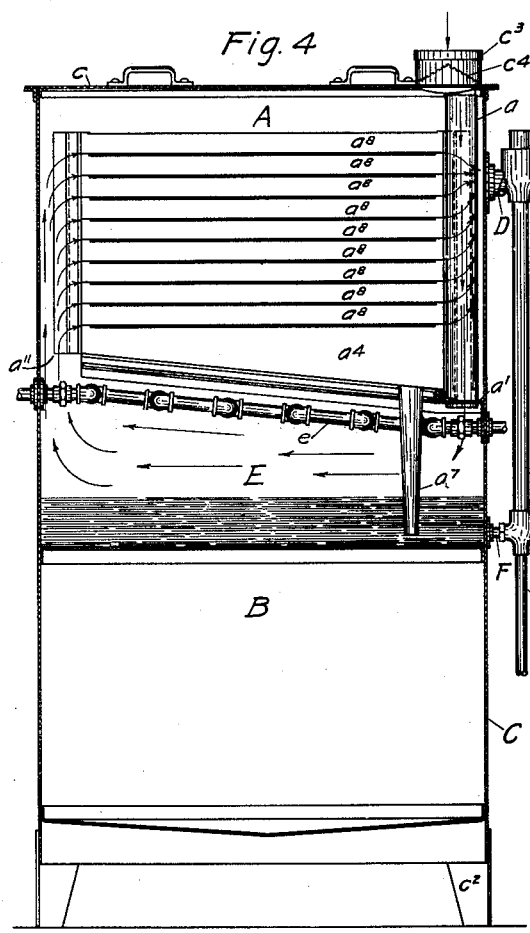
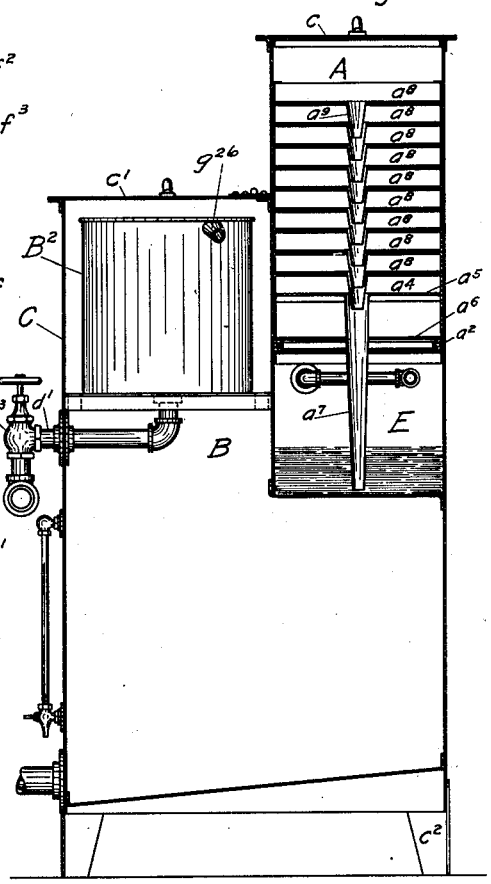

UNITED STATES PATENT OFFICE.

ROBERT E. LANGSTON, OF FORT WAYNE, INDIANA, ASSIGNOR TO WAYNE OIL TANK AND PUMP COMPANY, OF FORT WAYNE, INDIANA, A CORPORATION OF INDIANA.

APPARATUS FOR PURIFYING AND FILTERING LIQUIDS.

1,407,762. Specification of Letters Patent. Patented Feb. 28, 1922.

Application filed October 13, 1919. Serial No. 330,476.

*To all whom it may concern:*

Be it known that I, ROBERT E. LANGSTON, a citizen of the United States, residing at Fort Wayne, in the county of Allen and State of Indiana, have invented new and useful Improvements in Apparatus for Purifying and Filtering Liquids, of which the following is a specification.

My invention relates to apparatus for purifying and filtering liquids, such as oil and the like, and the object of my invention is to provide a highly efficient, simple and compact apparatus, the parts of which are readily accessible for cleaning.

It is well known that physical combinations of liquids with impurities of greater specific gravity will precipitate those impurities if the impure liquids are allowed to remain in a comparatively thin sheet and quiet state, for a sufficient period of time. It is the velocity of a flowing liquid that causes it to carry particles of impurities that are heavier than the liquid.

It is also well known that, generally, components of physical combinations of liquids will separate from each other under similar conditions, but in certain instances this is not true, as in the case of water entrained in oil, unless heat is applied in addition to these above mentioned favorable conditions.

It is also well known that liquids may be relieved of their impurities, consisting of solid matter, if strained through a filtering material of sufficient density; but many straining operations in filters are rendered inefficient by the lack of uniformity of the voids of the filtering material.

A thoroughly efficient filtering device for dirty oils and the like may, therefore, be constructed with shallow pans of large area, in which the dirty oil is allowed to stand, at a proper temperature, quietly for a long time; and the oil from which the impurities thus precipitated is then run through a suitable filter strainer. But modern industrial conditions require that devices of this type shall not only be efficient, but shall in proportion to the amount of oil per hour filtered through them, occupy a relatively small space. The problem is, therefore, to provide a high degree of efficiency with a high degree of concentration.

The improved construction herein illustrated and described discloses an efficient combination and arrangement of parts, constituting such a mechanism as modern industrial needs demand. All parts requiring cleaning are readily accessible, and full sized devices may be, with ease, torn down, cleaned and re-assembled by one man and in a very short space of time.

Another object of my invention is to provide improved means for carrying away the precipitated impurities, not only from the remaining purified liquids, but out of the body or path of flow of the raw liquid to be treated. Where the liquid being treated is dirty oil containing water, the water is likewise precipitated and carried away so that it is impossible for it to again become mingled with the body of oil undergoing treatment.

In the particular embodiment of my invention selected for illustration;

Figure 1, is a front elevation of an oil filtering apparatus,

Figure 2, is a side elevation,

Figure 3, is a top plan view with both covers removed.

Figure 4, is a vertical section on the line 4—4 of Fig. 3,

Figure 5, is a vertical section on the line 5—5 of Fig. 3,

Figure 6, a detail, is a vertical axial section of the water overflow column on the line 7—7 of Fig. 3, and shows adjacent parts of the precipitation and heating compartments.

Figure 7, a detail, is a vertical section of one corner of the precipitation and heating compartments on the line 8—8 of Fig. 3, showing means for supporting the trays and sealing them in position, Figure 8, a detail, is a top plan view of the bottom precipitation tray, Figure 9, a detail, is a section through this tray on line 10—10 of Fig 8, Figure 10, is an enlarged sectional detail of strainer box and adjacent parts.

Referring now to the drawings, the filtering apparatus is enclosed in a casing C, leak tight on the bottom, sides and ends and composed of two main compartments, namely, a precipitation compartment A, and a filter strainer compartment B, each of which is open at the top. A cover $c$, is provided to close the opening of the precipitation compartment, and a cover $c^1$, to close the opening of the filter strainer compartment. The whole apparatus may be supported on feet $c^2$, or in any other convenient manner. The casing is ordinarily made of sheet metal, suitably reinforced, if the size requires it.

The cover $c$, is provided at one corner with a strainer box $c^3$, within which is a wire cloth strainer $c^4$, adapted to remove any coarse particles of dirt from the dirty oil fed into the strainer box. The lower end of this strainer box fits into a vertical pipe $a$, in the corresponding corner of the precipitation chamber A, which pipe terminates on the underside of a flanged support $a^1$, which together with the sloping bottom of the lower tray $a^4$, forms the bottom of the precipitation compartment. Preferably this support extends across both sides and at the back of the trays next the oil inlet, but is not used at the front of the trays where the oil passes upwardly to the trays.

This flanged support is preferably made narrow at the sides and wide at the end, and is provided on its upper side, near its inner edge, with a sealing strip $a^2$, of felt or the like. This flanged support $a^1$, has as a whole an inclination upward from the oil inlet end toward the end which forms the distribution header, so as to cause the dirty oil to flow constantly in the proper direction at all temperatures. Vertical strips of felt $a^3$, are secured in position to the sides of the precipitation compartment where the ends of the trays are when the trays are in position.

A plurality of trays are provided of such size as to fit snugly from side to side, within the precipitation compartment, so as to occupy approximately the entire width of the precipitation compartment and of such length as to fit snugly at the ends against the vertical felt strips $a^3$. These trays are designed to substantially fill the precipitation compartment, and are alike in every particular except that the bottom tray $a^4$, has a false bottom $a^6$, so sloped as to seat upon the supporting flanges and a long downwardly projecting spout $a^7$, extends from the true bottom $a^5$, through and below the false bottom. The function of this spout will hereafter be described. The space between the false bottom and true bottom serves as a heat insulator. Each of the super-imposed trays $a^8$, has a short spout $a^9$, long enough to enter the spout of the next lower tray. The spouts are all at the same relative place on the trays, and preferably at the center from side to side and near the end of said trays next to the collection header, hereinafter described. Obviously the true bottom $a^5$, of the tray $a^4$, could be omitted and the spout extended downwardly from the sloping bottom $a^6$. Then the next succeeding tray would have a longer spout than the remaining trays $a^8$. Where a comparatively low temperature only is required for the liquid to be treated the bottom of the bottom pan may be made flat instead of inclined.

Each of these trays has a corner support $a^{10}$, adapted to act also as a spacer between the trays. The space left between the trays is very small, so that only a very thin body of oil may pass between the trays. When the trays are in position, as shown in Figures 4, 5, 7 and 8, the bottom tray resting upon the felt strip $a^2$, completely seals off and prevents the passage of any fluid from below the trays to the part above the lowermost tray except through the opening $a^{11}$, at the front end of the trays.

The portion of the precipitation compartment at the ends of the trays $a^4$, and $a^8$, and above the opening $a^{11}$, constitutes a distribution header with the narrow, horizontal outlet passages between each two trays. Because the trays are wide in proportion to the rate of flow the raw, dirty oil flows across the trays so gently, when the device is in full operation, that there is no appreciable current, and the trays are preferably made shallow, as shown in the drawings, so as to give the maximum opportunity for precipitation of the water and sediment in the dirty oil. The space in the end of the precipitation compartment at the ends of the trays contiguous to the supply pipe $a$, as shown in the drawings, forms a collection header, where the partially purified oil is collected and conveyed to the outlet pipe D, which conveys it to the filter strainer chamber B, through pipes $d$, $d^1$, controlled respectively by the globe valves $d^2$ and $d^3$.

Underneath the precipitation compartment, and really a continuation of the same, is a heating compartment E, with suitable pipe coils $e$, through which steam or hot water is circulated. As the viscosity of an oil is reduced by heat, the heating accelerates the action of gravity, tending to precipitate the heavier foreign matter. It will be observed that the spout $a^7$, of the tray $a^4$, extends nearly to the bottom of this heating compartment and well into the body of water maintained therein, at a constant level. A water overflow column consisting of an inner tube F, terminates at its lower end in the heating compartment, well toward the bottom of the portion thereof occupied by water, and extends upwardly to a height sufficient to balance the head of oil in the connected heating and precipitation compartments. This tube F, is within an overflow tube $f$, which conveys the waste water to a drain pipe $f^1$. The water tube F, is provided with a vertically adjustable spill $f^2$, to adjust the apparatus so as to balance different weights of oil being treated. The upper end of the pipe $f$, is provided with an enlargement $f^3$, to more readily catch the overflow.

Any suitable filtering device may be provided in the chamber B to complete the removal of foreign matter from the partially purified oil. A filtering device suitable for such use is illustrated and described in my co-pending application, Serial No. 396,570 filed July 15, 1920.

After the cover of the precipitation compartment has been removed the trays are all accessible for cleaning which may be accomplished with a stream of hot water by washing each pan while it is in place, then removing it and washing the next pan exposed. After all of the trays have been cleaned and removed, the inside of the compartment may be washed out, and the dirty waste drained to sewer through cleanout plug $e^1$ located in the bottom of heating compartment.

The efficient action of the separator leaves so little dirt to be removed by the filter medium that the length of time the filter strainer unit may be used before cleaning is greatly increased, consequently a closer woven filter medium may be employed, which will necessarily result in a more perfectly clarified oil.

The operation of my apparatus is as follows:

A quantity of clear water sufficient to balance the head of oil in the apparatus, when in full operation, is placed in the bottom of the heating compartment E, as shown in Figure 4. And after the apparatus is in operation the spill $f^2$, is adjusted to the weight of the particular oil being treated. The dirty oil is fed into the strainer box $c^3$; passes through the strainer $c^4$, leaving any coarse impurities; passes downwardly by gravity through pipe $a$, to the compartment E, where it is heated, rises, moves along the underside of the false bottom $a^6$, of the tray $a^4$, and passes upwardly through the opening $a^{11}$, to the distribution header; thence it flows through the horizontal spaces between the trays and very slowly across the trays, dropping the larger portion of the impurities onto the bottom of the trays and thence through the spouts into the body of water in the heating compartment E. The oil relieved of these impurities, which, by the way, generally, constitutes about ninety per cent of the total impurities, then passes out into the collection header and thence through pipe D, valves $d^2$ and $d^3$, pipes $d$ and $d^1$ and through the filtering means in chamber B.

My apparatus may be modified in many particulars without departing from the spirit of the invention; as by change of shape of the casing, by providing a separate heat insulating protector under the bottom tray instead of the false bottom, by constructing the trays with small holes near the top of the ends to let liquid in and out instead of with spacers between to form inlet and outlet spaces for the liquid, or by slightly sloping the bottoms of the trays toward the spouts whether the spouts depend from toward one end of the bottom or from some other part of the bottom. The strainer box, strainer and the vertical pipe $a$, may be entirely separate from and outside of the precipitation compartment.

This enumeration of modifications is not to be interpreted as placing a limitation upon the modifications that may be made within the scope of my invention.

I claim as my invention and desire to secure by Letters Patent of the United States.

1. An apparatus for purifying and filtering dirty liquids having in combination a precipitation compartment and its mechanism; a heating compartment and its mechanism; the former above the latter; the said two compartments separated from each other by an inclined partition, leak-tight, except at the high part of said partition where a passage-way for heated liquid is provided and toward the low part where an opening is provided for a drain spout; a filter strainer compartment and its mechanism, and a liquid connection from the precipitation compartment to the filter strainer compartment.

2. An apparatus for purifying and filtering dirty liquids having in combination a precipitation compartment with a plurality of removable horizontally placed shallow trays therein; a heating compartment with heating means therein; the precipitation compartment above the heating compartment; the said two compartments separated from each other by an inclined partition, leak-tight, except at the high end of said partition where a passage-way for heated liquid is provided and toward the low end where an opening is provided for a drain spout; a filter strainer compartment and its mechanism, and means for conveying liquid from the precipitation compartment to the filter strainer compartment.

3. An apparatus for purifying and filtering dirty liquids, having in combination a precipitation compartment with a plurality of removable horizontally placed shallow trays therein; the lowermost of said trays provided with a false bottom; a heating compartment with heating means therein; the precipitation compartment above the heating compartment, the said two compartments separated from each other by an inclined partition, leak-tight, except at the high end of said partition, where a passage-way for heated liquid is provided and toward the low end where an opening is provided for a drain spout; a filter strainer compartment and its mechanism; and means for conveying liquid from the precipitation compartment to the filter strainer compartment.

4. An apparatus for purifying and filtering dirty liquids having in combination a precipitation compartment with a plurality of horizontally placed shallow trays therein; the lowermost of said trays provided with a false bottom; a heating compartment with heating means therein; the precipitation compartment above the heating compartment, the said two compartments separated from each other by an inclined partition formed partly of the said false bottom of the lower-most tray, said partition, leak-tight, except at its high end where a passage-way for heated liquid is provided and toward the low end where an opening is provided for a drain spout; a filter strainer compartment with filter strainer therein; and means for conveying liquid from the precipitation compartment to the filter strainer compartment.

5. An apparatus for purifying and filtering dirty liquids, having in combination a precipitation compartment and its mechanism; a heating compartment and its mechanism, the former above the latter; the said two compartments separated from each other by an inclined partition, leak-tight, except at the high end of said partition where a passage-way for heated liquid is provided and toward the low end for drain spout; and a filter strainer compartment and its mechanism, and a liquid connection from the precipitation compartment to the filter strainer compartment.

6. An apparatus for purifying and filtering dirty oil, having in combination a precipitation compartment and its mechanism; a heating compartment and its mechanism and a filter strainer compartment and its mechanism, the first and second named comprising a precipitation compartment above and a heating compartment below in a single casing, a removable partition for sealing these compartments from each other, except where open to permit dirty oil to pass from the heating compartment to the precipitation compartment, and a spout to permit precipitated foreign matter to pass from the precipitation compartment to the heating compartment, a plurality of shallow horizontally disposed trays with telescoping downwardly extending spouts, the lower one of which spouts extends to near the bottom of the heating compartment, means for maintaining during operation of the apparatus a body of water sufficient to extend well up on the spout of the bottom tray, means for heating the dirty oil before it enters the precipitation compartment, the trays of such shape and size as together to fill the precipitation compartment except a vertical space across each end of the stack of trays, passages to permit the oil to flow across the trays from the dirty oil inlet end to the opposite end, sealing material so disposed as to prevent the oil in the precipitation compartment from passing from one end of the compartment to the other except across the trays, an outlet to permit the purified oil to flow from the precipitation compartment, an oil inlet containing a screen and a conductor for conveying the oil from the inlet to the heating compartment and the third named compartment comprising a filter strainer unit in said compartment, and a connection for conveying the oil from the precipitation compartment to the filter strainer compartment.

7. In an apparatus for purifying and filtering liquids, a compartment adapted to hold a plurality of trays stacked one upon and directly above another, the horizontal cross sectional shape of the compartment conformed to that of the trays, said trays, spacers for holding said trays slightly separated; means for so sealing said stack of trays in position in said compartment as to allow the liquid passing over said trays to flow in one direction only and that lengthwise of the trays, a common distribution header for the inlets between the trays, means for conveying dirty liquid to said header, a common collection header for the outlets between the trays, and a discharge pipe from said collection header.

8. In an apparatus for purifying and filtering liquids, a compartment adapted to hold a plurality of trays stacked one above the other, said trays of such widths as to substantially fill the compartment from side to side and of such length as to leave a space at both ends of the trays, spacers for holding said trays slightly separated, means for so sealing said stack of trays in position in said compartment that dirty liquid will pass across said trays only from one end thereof to the other, means for feeding dirty liquid into one end of the compartment, and means for withdrawing purified liquid from the other.

9. In an apparatus for purifying and filtering liquids, a compartment adapted to hold a plurality of horizontally placed trays stacked one upon and directly above the other, said trays of such width as to substantially fill the compartment from side to side and of such length as to leave a space at the end of the trays where the dirty liquid is fed in as a distribution header, a space at the other end of the trays where the liquid is withdrawn as a collection header, means for holding said trays slightly separated, means for ensuring the passage of dirty liquid from the distribution header across the trays to the collection header, means for supplying dirty liquid to the distribution header, and means for conveying purified liquid from the collection header.

10. In an apparatus for purifying and filtering liquids, a precipitation compartment with the center of the bottom open, a shallow tray adapted to complete the bottom of said compartment when sealed in position and to occupy the space therein from side to side, a plurality of similar sized trays stacked one upon the other with the lower one upon said bottom tray, a vertical space at the dirty liquid end of the trays forming a distribution header, the bottom of said compartment at said dirty liquid end open to allow dirty liquid to pass into said distribution header, a vertical space at the purified liquid end of the trays forming a collection header, a discharge pipe from said collection header, means for admitting dirty liquid to the upper part of one end of said trays from said distribution header, and means for allowing purified liquid to flow out of the upper part of the opposite end of said trays into the collection header.

11. In an apparatus having a precipitation compartment above a heating compartment, for purifying and filtering liquids, a precipitation compartment adapted to hold a plurality of trays stacked one upon and directly above another; means for holding the trays slightly separated from each other; said trays of such width as to substantially fill the compartment from side to side and of such length as to leave a space at both ends of the stack of trays; a partition between said compartments formed of a supporting flange with a sealing strip thereon on both sides and the back end of said trays and an inclined bottom for the bottom tray, which inclined bottom slopes upwardly from the dirty liquid receiving end of the heating compartment to the opening at the front end of the trays between the two compartments; means for heating the liquid to be treated in the heating compartment; means for sealing said stack of trays to ensure passage of the dirty liquid to be treated across said trays from the front end of said trays to the back end; means for feeding the dirty liquid to be treated to the heating compartment; and means for conveying away the purified liquid from the space back of the back ends of the trays.

12. In an apparatus having a precipitation compartment above a heating compartment, for purifying and filtering oils, a precipitation compartment adapted to hold a plurality of shallow trays stacked one upon and directly above another; means for holding the trays slightly separated from each other; said trays, of such width as to substantially fill the precipitation compartment from side to side, of such length as to leave a space at both ends of the stack of trays and each tray provided with a downwardly projecting spout in the same relative position; a partition between said compartments formed of a supporting flange with sealing means thereon on both sides and the back end of said trays and an inclined bottom for the bottom tray, which inclined bottom slopes upwardly from the dirty oil receiving end of the heating compartment to the opening at the front end of the trays between the two compartments; the spout on the bottom tray long enough to extend well toward the bottom of the heating compartment; means for heating the oil to be treated in the heating compartment; means for maintaining a sufficient body of water in the heating compartment for the bottom spout to extend into it; means for sealing said stack of trays to ensure passage of the dirty oil to be treated across said trays from the front end of said trays to the back end; means for supplying dirty oil to the heating compartment and means for conveying away the purified oil from the space back of the back end of the stack of trays.

13. In combination with oil purifying and filtering mechanism, a casing having a precipitation compartment above and a heating compartment below, and an inclined partition completely separating said compartments except at the high end of the partition, where an opening is provided.

14. In combination with oil purifying and filtering mechanism, a casing having a precipitation compartment above and a heating compartment below, a removable precipitation tray with an endwise sloping bottom adapted to form the main portion of a partition between said compartments, a flange on the interior of said casing to support said tray, the flange and sloping bottom together forming a partition between said compartments, but leaving an opening on the high end of the tray to form a passage for oil from the heating compartment to the precipitation compartment and means for sealing the joint between said tray and said flange.

15. In an oil purifying and filtering apparatus, a precipitation compartment with leak tight sides and a flange support fixed to said sides at the bottom, packing on the upper side of said support near its inner edge, an opening to permit dirty oil to flow from beneath said precipitation compartment into it, a shallow tray with a depending spout said tray being substantially of the same width as said compartment, but of less length adapted to seat upon said packing so as with said flange support to form a leak-tight bottom for said compartment except where open, as above mentioned, a plurality of trays similar in shape and horizontal area to said bottom tray but with shorter spouts, said trays adapted to be stacked one above the other, spacers for holding said trays slightly separated, vertical sealing strips between the corners of said stack of trays and the sides of the compartment, a vertical space between the ends of the trays and the sides of the compartment at the oil inlet end in conjunction with the oil inlet spaces between the trays forming a dirty oil distribution manifold, a similar space at the opposite ends of the trays together with the oil outlet spaces between the trays and the outlet for the purified oil forming a purified oil collection manifold, and said outlet from said collection manifold.

16. An apparatus for purifying and filtering oil comprising a precipitation compartment and a heating compartment in a single casing, a support next the walls partly separating said compartments, means for heating said heating compartment, means for maintaining a body of water in the bottom of said heating compartment, one of the ends of said support omitted to permit dirty oil to pass from the heating compartment to the precipitation compartment, packing on the upper side of said support at its inner edge, a shallow tray with a depending spout long enough to extend well into the body of water maintained in the heating compartment, packing adapted with the support and tray to make a leak-tight partial partition as described between said compartments, said tray substantially of the same width as said compartment but of less length, a plurality of trays similar in horizontal area to said bottom tray but with shorter spouts, each loosely extending into that of the tray beneath when stacked directly above each other, vertical sealing strips between each corner of said stack of trays and the adjacent side of the compartment, a vertical space at the inlet end of said trays forming a distribution manifold, a vertical space at the outlet end of said trays forming a collection manifold, means for admitting dirty oil to the upper part of said trays from the distribution manifold and means for allowing purified oil to flow out of the upper part of said trays into the collection manifold.

17. An apparatus for purifying and filtering oil comprising a precipitation compartment above and a heating compartment below in a single casing, a removable partition for sealing these compartments from each other, except where omitted to permit dirty oil to pass from the heating compartment to the precipitation compartment, and to permit precipitated foreign matter to pass from the precipitation compartment to the heating compartment, a plurality of shallow horizontally disposed trays with telescoping downwardly extending spouts, the lower one of which spouts extends to near the bottom of the heating compartment, means for maintaining in the heating compartment during operation of the apparatus, a body of water extending well up on the spout of the bottom tray, means for heating the dirty oil before it enters the precipitation compartment, the trays of such shape and size as together substantially to fill the precipitation compartment except a vertical space across the opposite ends of the trays, passages to permit the oil to flow across the trays from the dirty oil inlet end to the opposite end, sealing material so disposed as to prevent the oil in the precipitation compartment from passing from one end of the compartment to the other except across the trays, an outlet to permit the purified oil to flow from the precipitation compartment, an oil inlet box containing a screen and a conductor for conveying the oil from inlet box to the heating compartment.

18. In an apparatus for separating the foreign matter from dirty oil, a plurality of horizontally disposed substantially shallow precipitation trays and means for causing the oil to flow over them in one direction only and from end to end.

19. In an apparatus for separating the foreign matter from dirty oil, a vertical stack of horizontally disposed shallow precipitation trays with downwardly extending telescoping spouts and means for causing the oil to flow across them lengthwise in one direction only.

In testimony whereof I have hereunto set my hand in presence of two subscribing witnesses.

ROBERT E. LANGSTON.

Witnesses:
FRED C. JENNER,
Z. WENCHOFF.